United States Patent [19]

[11] Patent Number: 4,552,450

Tomosada et al.

[45] Date of Patent: Nov. 12, 1985

[54] VARIABLE MAGNIFICATION APPARATUS WITH LENS POSITION CONTROL

[75] Inventors: Masahiro Tomosada, Kawasaki; Katsuyoshi Maeshima, Tokyo; Tsuneki Inuzuka, Machida; Hisashi Sakamaki, Yokohama, all of Japan

[73] Assignee: Canon Kabushiki Kaisha, Tokyo, Japan

[21] Appl. No.: 402,580

[22] Filed: Jul. 28, 1982

[30] Foreign Application Priority Data

Aug. 8, 1981 [JP] Japan ................................ 56-124223

[51] Int. Cl.⁴ ...................... G03G 15/00; G03B 27/34

[52] U.S. Cl. ..................................... 355/14 R; 355/56

[58] Field of Search ..................... 355/8, 11, 14 R, 51, 355/55-57, 60, 65, 66

[56] References Cited

U.S. PATENT DOCUMENTS 4,351,606 9/1982 Franko ............................ 355/14 R

FOREIGN PATENT DOCUMENTS 0030282 6/1981 European Pat. Off. .
0051393 5/1982 European Pat. Off. .
1554061 10/1979 United Kingdom .
1594653 8/1981 United Kingdom .
1604763 12/1981 United Kingdom .

*Primary Examiner*—A. T. Grimley
*Assistant Examiner*—J. Pendegrass
*Attorney, Agent, or Firm*—Fitzpatrick, Cella, Harper & Scinto

[57] ABSTRACT

A copying apparatus having a lens position control device capable of setting the copying lens in plural positions for obtaining plural image magnification ratios. The lens position is determined by a control device in response to signals from a lens position detector and pulse signals from a pulse signal generator.

6 Claims, 5 Drawing Figures

VARIABLE MAGNIFICATION APPARATUS WITH LENS POSITION CONTROL

BACKGROUND OF THE INVENTION

1. Field of the Invention

The present invention relates to a copying apparatus provided with a control device for controlling the lens position for varying the image magnification ratio.

2. Description of the Prior Art

In conventional copying apparatus capable of varying the image magnification or power ratio, the copying lens is usually moved by a motor to a position corresponding to a desired lens power, while a lens position detector is used for identifying whether the lens is actually in such desired position, thus controlling the position of the lens. Such conventional copying apparatus with such variable image power function is usually capable of image reduction in two image powers, for example 0.68 and 0.78 times of the original size, and a lens position detector is provided for each lens position corresponding to each image power. However in a copying apparatus capable of providing multiple image powers, such method, requiring lens position detectors corresponding to the number of available image powers, is disadvantageous not only in the functional reliability but also in the cost of the apparatus. Also the mechanism for providing multiple image powers is inevitably quite complicated and does not practically allow the detection of lens position.

SUMMARY OF THE INVENTION

The object of the present invention is to resolve the aforementioned drawbacks of the conventional technology and to provide a copying apparatus having a lens position control device capable of setting the lens in plural positions for different image magnifications by means of a simple structure.

Another object of the present invention is to provide a copying apparatus provided with a lens position control device with a high safety or reliability.

Still another object of the present invention is to provide a copying apparatus capable of rapidly changing the lens position even when the selected image power is changed during the lens displacement.

Still another object of the present invention will become fully apparent from the following description of the preferred embodiments to be given in conjunction with the attached drawings.

DESCRIPTION OF THE PREFERRED EMBODIMENTS

Now the present invention will be clarified in detail by an embodiment thereof shown in the attached drawings.

Figure 1:
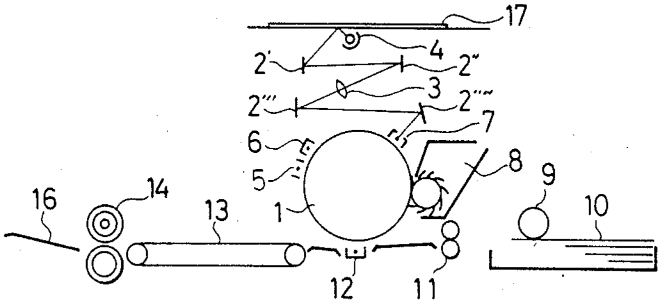
FIG. 1 is a schematic view of a copying apparatus to which the present invention is applicable.

FIG. 1 is a schematic view of an electrophotographic copier in which the present invention was applied. A rotary photosensitive member 1 of drum shape was subjected to pre-charging by a charger 5, then primary charging by a charger 6 and further charging by a charger 7 simultaneously with an imagewise exposure to form an electrostatic latent image on said photosensitive member 1 corresponding to the image of an original. Said photosensitive member was thereafter uniformly exposed to light when desired. Beneath a glass plate 17 for supporting the original there was horizontally provided an exposure lamp 4, and the light therefrom was reflected by a mirror 2 and projected onto the photosensitive member 1 through a lens 3. The electrostatic latent image formed on the photosensitive member 1 corresponding to the original image was then rendered visible by deposition of developer in a developing station 8.

A transfer sheet 10 was supplied by a feed roller 9 and registering rollers 11 toward the photosensitive member 1, where the developer retained thereon was transferred by a transfer charger 12 onto the transfer sheet 10 to form a reproduced image thereon. Thereafter the transfer sheet 10 was separated from the photosensitive member 1, transferred by a conveyor 13 to a fixing station 14 for image fixation, and ejected onto a tray 16.

In order to vary the magnification or power of the reproduced image, it was necessary to change the position of the lens 3 in the exposure optical path along the axis thereof, and to change the ratio of the original scanning speed and the rotating speed of the photosensitive member 1 according to the selected image power.

The above-described structure and function of the electrophotographic copier are already known in the prior art and will therefore not be explained in further detail.

Now there will be given an explanation on a system for varying the power of the reproduced image, in particular relation to the lens displacement.

Figure 2:
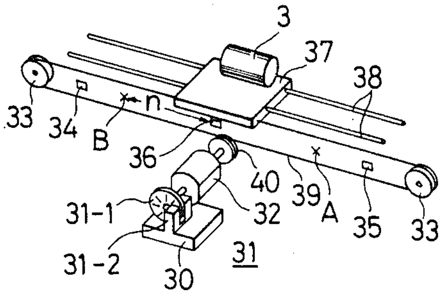
FIG. 2 is a schematic view showing an embodiment of the lens drive mechanism according to the present invention.

FIG. 2 is a schematic view of a lens displacing mechanism, wherein the lens 3 was fixed on a support member 37 slidably supported by a pair of guide bars 38 extending parallel to the direction of lens displacement. A wire 39 was extended between rotatably fixed support members 33. A motor 32 rotated a pulley 40 for displacing the lens 3 by way of the wire 39. Said motor 32 was also connected to pulse generator means 31, which was composed of a slit disk 31-1 having a plurality of regularly distanced slits along the periphery thereof, a photointerrupter 31-2 consisting of a light-emitting element and a photosensor element positioned across said disk, and a support member 30 for supporting said photointerrupter 31-2. It was thus possible to determine the lens moving distance per a pulse signal from the pulse generator means 31, since said pulse generator means 31 was capable of generating serial pulse signals in relation to the function of the motor 32.

In the present embodiment a reference lens position was detected by a sensor 36, which could be placed at a lens position corresponding to an image power of unity. Additional sensors 34, 35 were respectively placed at a position corresponding to a maximum image power or beyond said position, and at a position corresponding to a minimum image power or beyond said position. It was also possible to select one of said sensor positions as the aforementioned reference position and the other as a stopper position for stopping or reversing the lens, but, in the present embodiment, the positions of said sensors 34, 35 were both selected as stopper positions.

Figure 3:
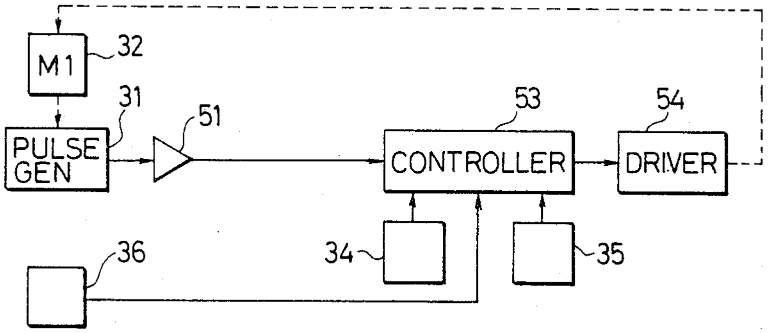
FIG. 3 is a block diagram showing an embodiment of the lens drive control circuit according to the present invention.

Now reference is made to FIG. 3 for explaining the lens position control in case the aforementioned reference position sensor 36 is provided at a lens position corresponding to an image power of unity.

In response to a copy command with a unity image power supplied from an unrepresented control unit of the copier, a controller 53 identified whether the reference position sensor 36 detected the lens 3, and released a drive signal for the motor 32 in case said lens 3 was not at the reference position, thereby driving the motor 32 through a driver circuit 54 to displace the lens 3 in one direction and to search the reference position. Pulse signals generated by the pulse generator means 31 simultaneously with said motor driving were supplied through a pulse shaping circuit 51 to the controller 53, which, upon receipt of said pulses exceeding a predetermined number N, inverted the rotating direction of the motor thereby displacing the lens 3 in the opposite direction. Said predetermined pulse number N corresponded to the distance between the lens position for maximum image power and that for minimum image power, or between the reference lens position and the lens position for maximum or minimum image power. In case the lens 3 was detected by the reference position sensor 36 prior to the entry of pulses of said predetermined number N or after the inversion of the displacing direction of the lens 3, the motor 32 was stopped to set the lens at said reference position.

The above-described procedure can also be conducted in response to a power-on signal generated when the operator turns on a power switch for supplying electric power to the various units of the copier. In such case the lens is automatically set at the lens position for unity image power as soon as the power supply to the apparatus is turned on, even without a copy command with image power of unity.

Also at the lens setting to the reference position, the displacing direction of the lens may be inverted by the sensors 34, 35.

Then, in response to a command for a first varied image power, the lens 3 is displaced from the reference position for unity image power to a position A corresponding to the selected image power. It is now assumed that the image power varies by 0.1 times by a lens displacement corresponding to 100 pulses from the pulse generator means 31. In case of moving the lens 3 to a position corresponding to an image power 0.66 times, the controller 53 released drive signals to drive the motor 32 through the driver circuit 54 until 340 pulses, corresponding to the reference position to a lens position for said first varied image power, are supplied from the pulse generator means 31 to the controller 53. In response to the entry of said 340 pulses, the motor 32 was stopped to set the lens at the desired position.

After said lens setting the motor 32 was locked by a brake, which was only released in synchronization with the succeeding drive for the motor. In this manner the lens is fixed at the position corresponding to the first image power. A similar procedure is followed also for the lens setting at the reference position for unity image power or at other lens positions for different image powers.

Also in case of moving the lens from the position for the first image power to another position for the second image power, the motor 32 was activated until receipt of pulses of a number $\alpha$, which, together with the aforementioned 340 pulses, corresponded to n pulses indicating a distance to the position for the second image power from the reference position for the unity image power, whereby the lens was set at the position B for the second image power. In this case, as shown in FIG. 2, the lens was displaced to the right from the position A, then reversed to the left at the sensor 35 and stopped at the position B where the pulse count reached the aforementioned number n. Such procedure could be achieved by storing the aforementioned 340 pulses in a random access memory of the controller 53 while the power supply thereto was maintained.

In the absence of the sensor 35, the reversing of the lens displacement toward the position B can also be achieved by a pulse count corresponding to the position of said sensor 35. Such procedure can be realized by storing the number of pulses in a read-only memory of the controller 53, corresponding to the stroke from the reference position 36 to the position of the sensor 35.

The above-described lens setting operation can be executed in response to a manual command for a desired image power, but unnecessary motions in the apparatus can be avoided if such command is once stored in the random access memory and only executed in response to a copy start command. Such command stored in the random access memory can be cancelled by a clear key for cancelling the desired number of copies.

In the present embodiment the controller 53 was composed of an already known one-chip microcomputer, for example μPD7801G supplied by Nippon Electric Company.

Figure 4A:
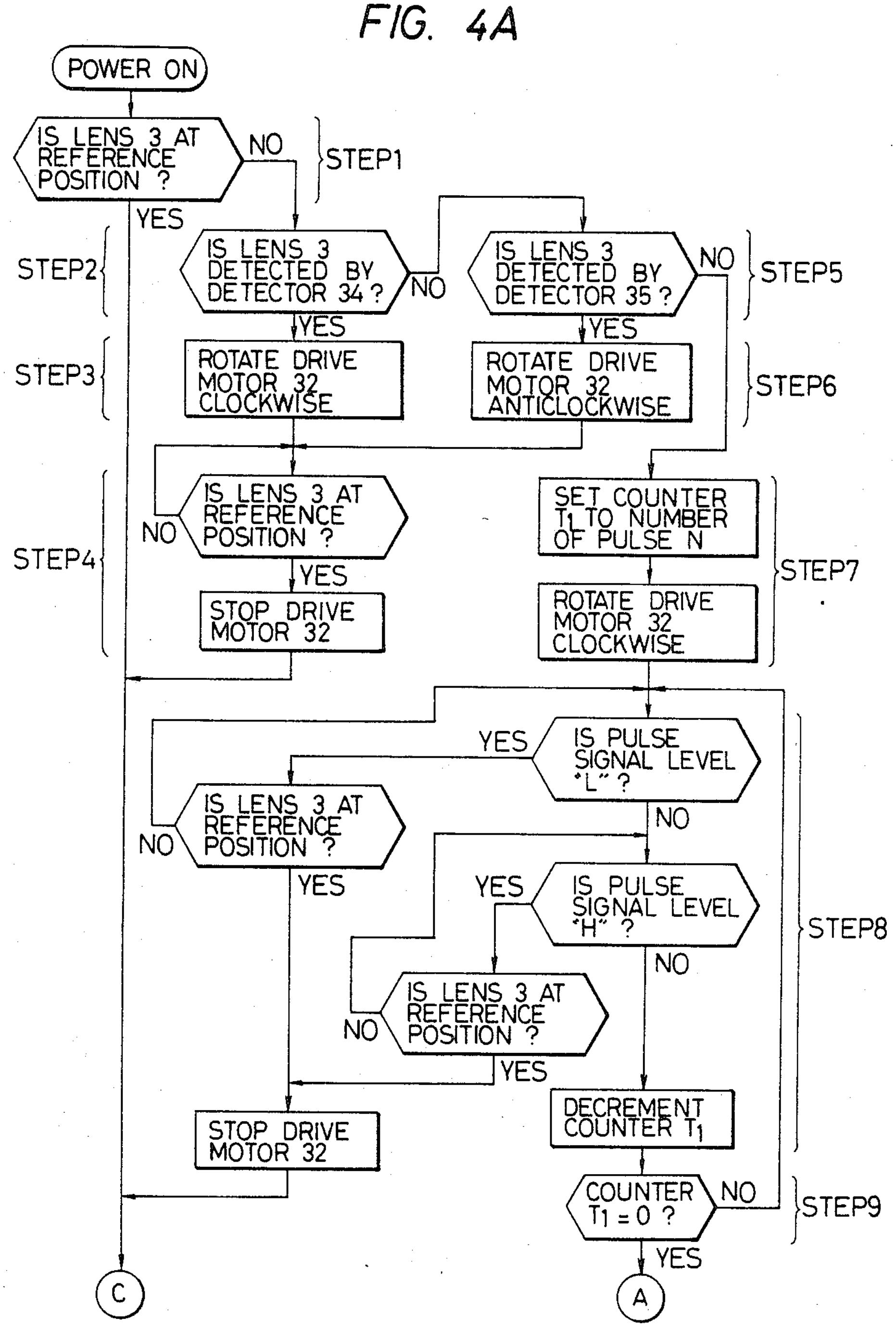
FIGS. 4A and 4B are control flow charts showing an example of the sequence control according to the present invention.
Figure 4B:
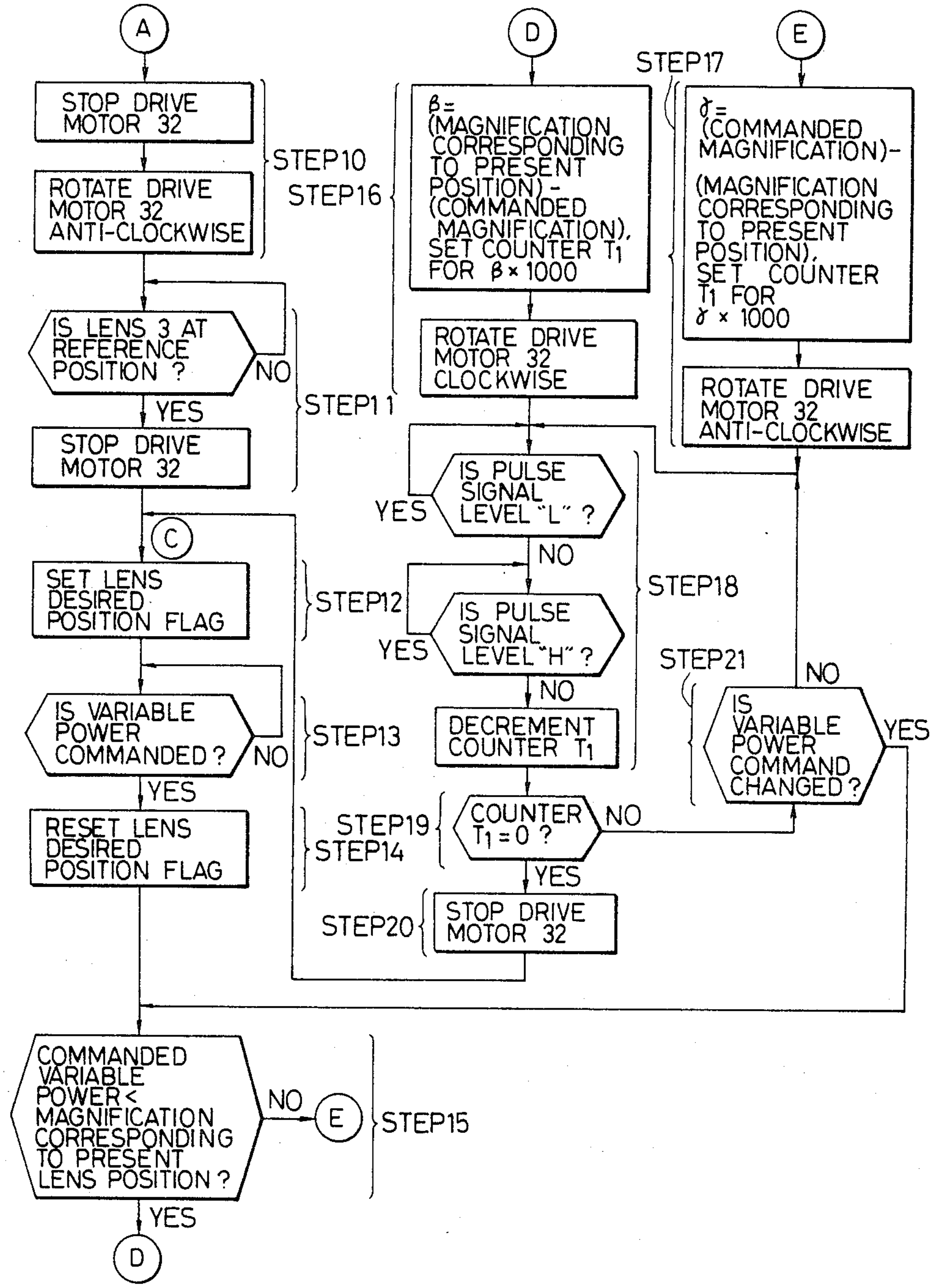

FIGS. 4A and 4B show an example of the control flow chart of the present invention, which is stored as a program in the read-only memory of the controller 53, and which will be explained in detail in the following.

After the start of power supply, the Step 1 is executed to identify, by the reference position sensor 36, if the lens 3 is located at the reference position. In case the lens 3 is not at the reference position, the Step 2 identifies if the sensor 34 detects the lens 3. If the lens 3 is detected by the sensor 34 in the Step 2, the Step 3 is executed to rotate the motor 32 clockwise. If the lens 3 is detected by the reference position sensor 36 in the Step 4, the controller identifies the lens displacement to the reference position and stops the motor 32. On the other hand, if the lens 3 is not detected by the sensor 34 in the Step 2, the program proceeds to the Step 5 for identifying whether the sensor 35 detects the lens 3. Upon detection of the lens 3 by the sensor 35 in the Step 5, the Step 6 is executed to rotate the motor 32 anticlockwise. Then the Step 4 is executed, and, upon detection of the lens 3 by the reference position sensor 36, stops the motor 32. On the other hand, if the lens 3 is not detected by the sensor 35 in the Step 5, the Step 7 is executed to set a pulse number N in a counter T1 of the controller 53 and to activate the motor 32 clockwise. In the succeeding Steps 8 and 9, the pulses from the pulse generator means 31 and counted and the content of said counter T1 is correspondingly decreased. Also the motor 32 is stopped if the lens 3 is detected by the reference position sensor 36 in the course of said pulse counting. Upon arrival of the counter T1 at zero in the Step 9, the program proceeds to the Step 10 in which the motor 32 is stopped and then activated anticlockwise. The Step 11 continues to look for the lens 3 by the reference position sensor 36, and upon detection, stops the motor 32. The succeeding Step 12 sets a lens desired position flag for checking if the lens 3 has arrived at the desired position.

In case a command for a varied image power is entered to the controller 53 in the Step 13, the aforementioned flag is reset in the Step 14 and the program proceeds to the Step 15 to identify if the commanded image power entered to the controller 53 is smaller than the image power corresponding to the current lens position. If the commanded image power is smaller than the current image power, the program proceeds to the Step 16 in which the pulse number to be set in the counter T1 is determined by subtracting the commanded image power from the image power corresponding to the current lens position and multiplying the obtained difference by 1,000. Thereafter the motor 32 is driven clockwise to set the lens 3 at the position corresponding to the commanded image power. On the other hand, if the commanded image power is larger than the image power corresponding to the current lens position, the program proceeds to the Step 17 in which the pulse number to be set in the counter T1 is determined by subtracting the image power corresponding to the current lens position from the commanded image power and multiplying the obtained difference by 1,000. Thereafter the motor 32 is driven anticlockwise. In the Steps 18 and 19, the pulses generated by the pulse generator means 31 are counted and the content of the counter T1 is correspondingly decreased. Upon arrival of the counter T1 at zero in the Step 19, the controller identifies the lens setting at the position corresponding to the commanded image power and stops the motor 32 in the Step 20. Thereafter the program proceeds to the Step 12 for setting the lens desired position flag. Also in case a new command for varying the image power is entered from the unrepresented control unit during the displacement of lens 3 by the motor 32 for setting in a position corresponding to the previously commanded image power, such entry is identified in the Step 21 and the program proceeds to the Step 15. Thereafter the pulse number to be set in the counter T1 is determined and the direction of rotation of the motor 32 is determined in the aforementioned manner. In this manner the Step 21 allows to change the image power even during the displacement of lens 3 toward the position of a previously commanded image power, and to immediately determine the direction of rotation of motor and the displacing stroke of the lens 3.

In order to improve the precision of the above-described lens setting operation, it is necessary to consider, in the pulse counting, the excessive pulses generated by the inertia of the motor after the motor drive signal is terminated.

As explained in the foregoing, the present invention allows to set the lens in plural positions corresponding to various image powers by means of a simple structure. Also the present invention provides a copying apparatus capable of lens position control with a high safety or reliability, and also capable of rapidly changing the lens position even when the commanded image power is altered during the lens dis- placement.

The present invention is by no means limited to the foregoing embodiment but is subject to variations within the scope and spirit of the appended claims.

What we claim is:

1. A copying apparatus comprising:
an optical member;
drive means for driving said optical member in accordance with first and second magnifications, respectively, entered to produce images of various magnifications; and
control means for controlling said driving means to enable the second magnification to be entered during movement of said optical member to a position in accordance with the entered first magnification such that said optical member is positioned for the second magnification without it being first set to the position for the first magnification.

2. A copying apparatus according to claim 1, further comprising pulse generator means for generating serial pulses with movement of said optical member.

3. A copying apparatus according to claim 2, further comprising reference position sensor means for detecting a reference position of said optical member.

4. A variable magnification apparatus according to claim 3, wherein said control means determines a position of said optical member responsive to said serial pulses and a position signal from said reference position sensor means in accordance with an entered magnification.

5. A variable magnification apparatus according to claim 2 further comprising sensor means for sensing a position of said optical member, wherein said control means determines a position of said optical member responsive to said serial pulses and a position signal from said sensor means in accordance with an entered magnification, wherein said sensor means includes maximum optical member position sensor means located at or beyond an optical member stroke position corresponding to a maximum magnification and minimum optical member position sensor means located at or beyond an optical member stroke position corresponding to a minimum magnification, wherein one of said maximum optical member position sensor means and said minimum optical member position sensor means is adapted to generate a reference position signal for counting said serial pulses while the other generates a position signal for controlling the displacement of said optical member.

6. A variable magnification apparatus according to claim 4, wherein said control means controls said driving means so as to changeover the direction of displacement of said optical member when no less than a predetermined number of the serial pulses are counted upon displacement of said optical member to the reference position.

* * * * *